US006728817B1

(12) United States Patent  
Maxwell

(10) Patent No.: US 6,728,817 B1
(45) Date of Patent: Apr. 27, 2004

(54) INTEGRATED PACKET BUS FOR MULTIPLE DEVICES

(75) Inventor: Conrad A. Maxwell, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 649 days.

(21) Appl. No.: 09/781,617

(22) Filed: Feb. 12, 2001

(51) Int. Cl.[7] .............................................. G06F 13/00
(52) U.S. Cl. .................... 710/305; 370/432; 370/458
(58) Field of Search ............................... 710/305, 105; 370/916, 432, 458; 713/400

(56) References Cited

U.S. PATENT DOCUMENTS

| 5,025,442 A | * | 6/1991 | Lynk et al. ................. 370/280 |
| 5,278,831 A | * | 1/1994 | Mabey et al. ............... 370/349 |
| RE34,896 E | * | 4/1995 | Calvignac et al. .......... 370/359 |
| 5,684,806 A | * | 11/1997 | Akiyama .................... 370/522 |
| 6,345,072 B1 | * | 2/2002 | Liu et al. .................... 375/222 |
| 6,504,840 B1 | * | 1/2003 | Bostrom et al. ............. 370/360 |
| 6,504,853 B1 | * | 1/2003 | Lindgren et al. ............ 370/468 |
| 6,572,384 B1 | * | 6/2003 | Marchevsky ................. 439/43 |
| 6,584,100 B1 | * | 6/2003 | Ngo ............................ 370/377 |
| 6,647,451 B1 | * | 11/2003 | Barmore ...................... 710/301 |
| 2001/0014927 A1 | * | 8/2001 | Chang et al. ................ 710/102 |

* cited by examiner

Primary Examiner—Glenn A. Auve
Assistant Examiner—Nimesh G Patel
(74) Attorney, Agent, or Firm—Farjami & Farjami LLP

(57) ABSTRACT

A communications system includes at least two communications devices, a bus, and a controller for the bus. The communications system may be a riser card, including communications devices such as a DSL device, for example, and a HomePNA device, and the bus can be an integrated packet bus, using an integrated packet bus controller for controlling communications from the computer with the communications devices. The bus supports a communications protocol, which includes a control slot and data slots. Each bit of the control slot selects which of the data slot bits belongs to which of the communications devices. For example, with two communications devices, a 16-bit control slot can be filled with the bit pattern "0000111111111111" which indicates that the first 4 bits of the 16-bit data slot belong to the first communications device and the second 12 bits belong to the second communications device.

20 Claims, 6 Drawing Sheets

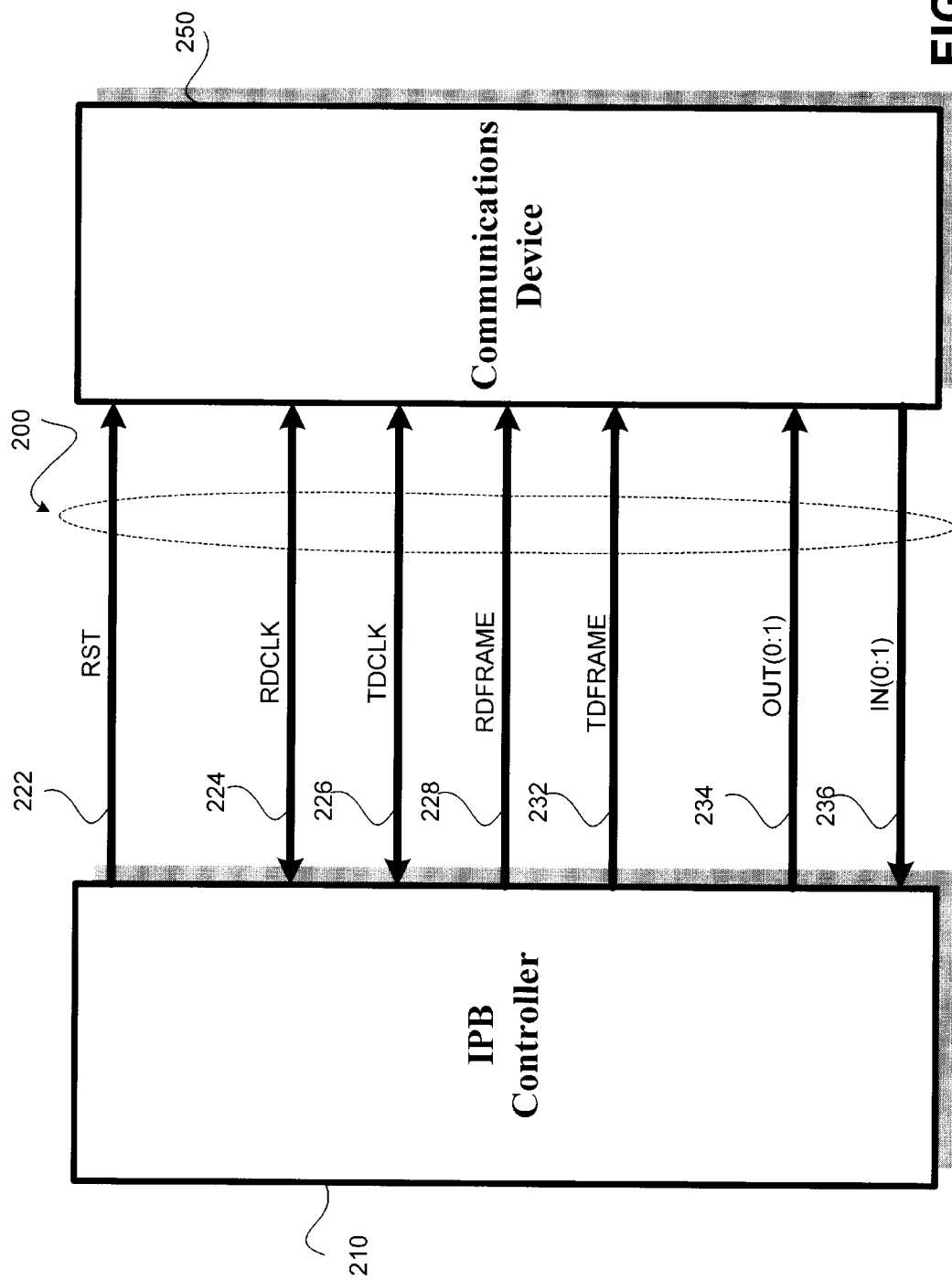

INTEGRATED PACKET BUS FOR MULTIPLE DEVICES

BACKGROUND OF THE INVENTION

1. Field of the Invention

The present invention relates generally to computer systems. More particularly, the present invention relates to a communication bus.

2. Related Art

Since the introduction of the Audio/Modem Riser ("AMR") in recent years, the computer industry has been struggling to define a next generation communications riser card, which can offer extended functionality and yet maintain backward compatibility with the existing platforms, such as AMR. Riser cards are not intended to be sold as retail upgrade products. Instead, riser cards are available to Original Equipment Manufacturers ("OEM") and system integrators as a resource to customize a system or a product line to the needs of market segments, market regions or individual users.

The AMR specification was introduced in 1998 as an open industry-standard that defines a hardware scalable OEM motherboard riser board and interface, which supports both audio and modem. AMR physically partitions and packages the analog I/O audio functions of modem circuitry together with a codec chip (which converts back and forth from analog to digital) on a small board that plugs directly into a computer's motherboard. Having the circuitry on the board eliminates the need for obtaining agency certification for the manufacture of a new motherboard design, which is a lengthy process, instead, only the small board is certified. The small board is typically referred to as a riser because it rises above the motherboard rather than laying flatly on it.

Although AMR has provided the computer industry with some momentum and perspective, AMR has failed to remain responsive to today's technological advancement and demands. In particular, AMR does not address the convergence and/or integration of various broadband, networking and advanced audio/modem technologies. For example, a riser could include several types of communication devices on the same small board, such as a digital subscriber line ("DSL") device, a local area network ("LAN") device, a Home Phoneline Networking Alliance ("HomePNA") device, and an audio/modem device. Each of these devices requires a controller and a bus to communicate with its controller on the computer's motherboard. Each link provided by a bus between a device and its controller must comply with specific characteristics for the signal between the device and its controller. Such signal characteristics may include, for example, signal names, descriptions, electrical properties, pin numbers and the like. Accommodation of several controllers and types of busses on the computer's motherboard has several disadvantages. For example, accommodation of several controllers and types of busses can cause replication of components which is expensive, wastes space on the computer's motherboard, and inefficiently coordinates utilization of the various technologies.

Accordingly, there is an intense need in the art for efficient linking between various communications technologies and/or devices, such as broadband and networking functions, and the host computer. Moreover, there is a need in the art for an efficient bus between various communications technologies and/or devices and the host computer for a next generation communications riser card, which provides an ability to support various communications technologies and/or devices.

SUMMARY OF THE INVENTION

In accordance with the purpose of the present invention as broadly described herein, there is provided method and system for a bus in the next generation communications riser card that is capable of supporting multiple communications devices. The invention addresses the intense need in the art for efficient linking between various communications technologies and/or devices, such as broadband and networking functions, and the host computer. Moreover, the invention provides an efficient bus between various communications technologies and/or devices and the host computer for a next generation communications riser card, which provides an ability to support various communications technologies and/or devices.

In one aspect of the invention, a communications system includes at least two communications devices, a communications bus, and a controller for communicating data with each of the communications devices via the communications bus. For example, the communications system may be a riser card, including communications devices such as a DSL device and a HomePNA device. The communications bus can be an integrated packet bus, for example, and the controller can be an integrated packet bus controller for controlling communications from the computer with the DSL and HomePNA devices using the integrated packet bus.

In one aspect, the communications bus supports a communications protocol which includes a control slot and at least one data slot. Each of the control slots and data slots has at least two bits. Each bit of the control slot selects which of the bits of the data slot belongs to which of the communications devices. For example, in the case of two communications devices, a 16-bit control slot can be filled with the bit pattern "0000111111111111" which indicates that for the following 16-bit data slot, the first 4 bits belong to the first communications device, the DSL device for example, and the second 12 bits belong to the second communications device, the HomePNA device for example.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 illustrates an IPB signal block diagram of a physical interface between a communications device and an IPB controller.

DETAILED DESCRIPTION OF THE INVENTION

The present invention may be described herein in terms of functional block components and various processing steps.

It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional data transmission, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
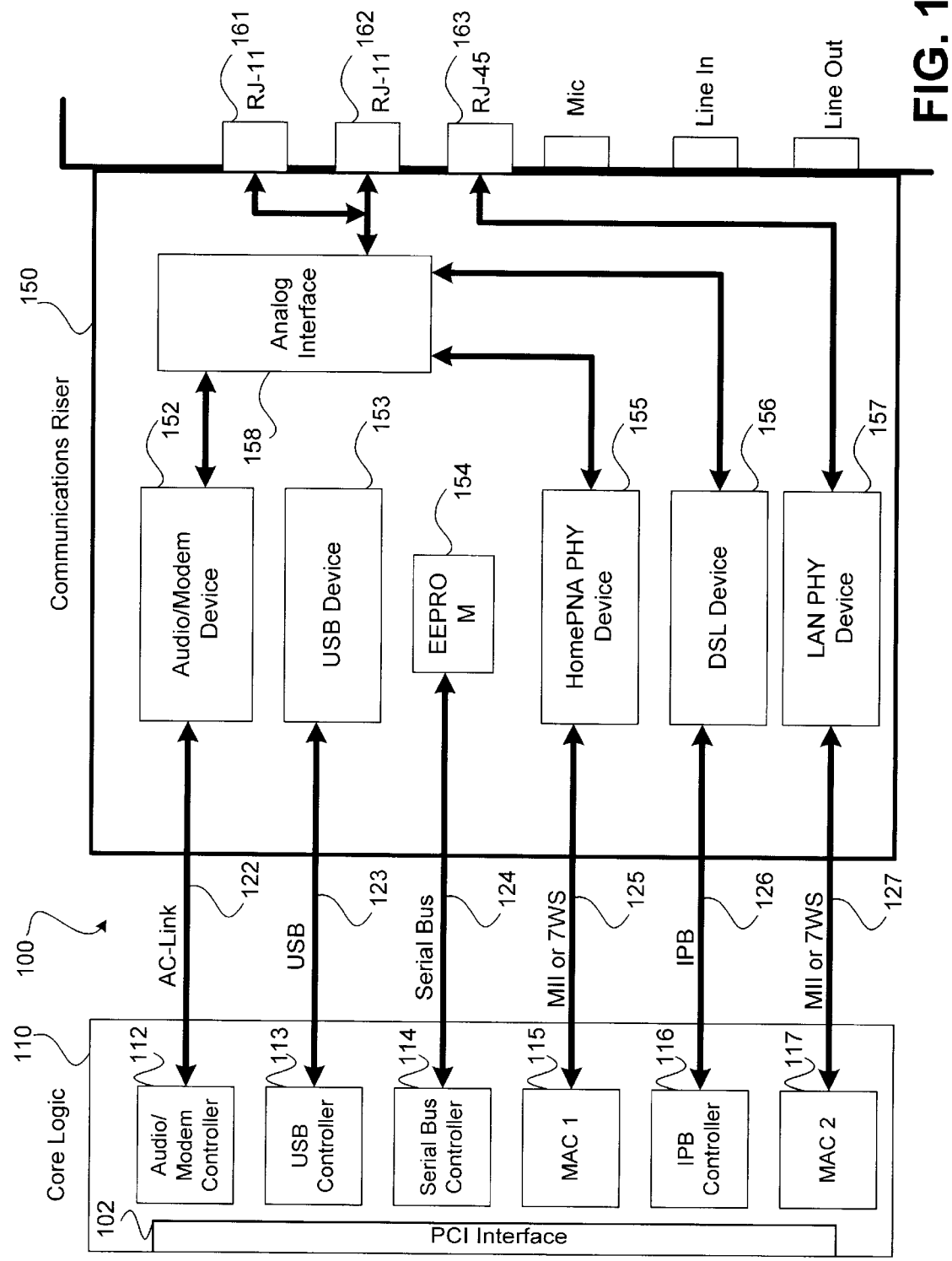
FIG. 1 illustrates a block diagram of an internal architecture of a communications system including a communications riser and a core logic.

FIG. 1 illustrates an internal architecture of communications system 100, including communications riser 150 and core logic 110. As shown, communications riser 150 supports audio/modem functions using audio/modem device 152 in communications with analog interface 158, which can be, for example, a data access arrangement ("DAA"). As shown, analog interface 158 is in communication with two RJ-11 connectors, telco RJ-11 connector 161 and handset RJ-11 connector 162. Communications system 100 uses telco RJ-11 connector 161 for communications with a Central Office ("CO") or outside telephone line and handset RJ-11 162 for connection to a handset for voice communications on the outside telephone line. Communications riser 150 further supports DSL functions using DSL device 156 and supports HomePNA ("Home Phoneline Networking Alliance") functions using HomePNA PHY ("physical layer") device or network device 155. As shown, DSL device 156 and HomePNA PHY device 155 are also in communication with analog interface 158, which is in turn in communication with telco RJ-11 connector 161 and handset RJ-11 connector 162. Communications riser 150 also includes LAN PHY ("local area network physical layer") device or network device 157. LAN PHY device 157 is in communication with Ethernet RJ-45 connector 163 for network communications purposes. Communications riser 150 may also support Universal Serial Bus ("USB") device 153 and may also include Electrically Erasable Programmable Read Only Memory ("EEPROM") 154 for configuration purposes.

As further shown in the example of FIG. 1, audio/modem device 152, HomePNA device 155, DSL device 156 and LAN device 157 may be controlled by PCI controllers, such as audio/modem controller 112, HomePNA controller 115 (MAC1) and LAN controller 117 (MAC2), respectively, which are located in core logic 110. MAC or Media Access Controller uses a protocol to control access to the physical transmission medium. MAC is typically built into network adapters. Common MAC controller standards are the Carrier Sense Multiple Access "CSMA"/Collision Detection ("CD") architecture used in Ethernet. In the present example, one or more controller functions may be provided by the host computer system. Furthermore, core logic 110 also includes USB controller 113 and serial bus controller 114 for controlling USB device 153 and EEPROM 154, respectively, on communication riser 150.

Devices on communications riser 150 may be accessed through PCI interface 102. PCI is a peripheral bus commonly used in host computers. PCI provides a high-speed data path between the host processor and peripheral devices. In the present example, audio/modem device 152, HomePNA device 155, DSL device 156 and/or LAN device 157 appear as PCI devices to the host computer. As another example, audio/modem device 152, HomePNA device 155, DSL device 156 and/or LAN device 157 may be mounted on the host computer motherboard and accessed via PCI interface 102.

Communications system 100 may utilize conventional buses, such as AC-Link 122, USB 123, serial bus 124, MII or 7WS 125, and/or MII or 7WS 127 for communications with computer system core logic 110, or in other examples, PCI ASIC or both via PCI interface 102. In the present example, communications riser 150 also supports Integrated Packet Bus ("IPB") 126 for communications with computer system core logic 110. IPB 126 is a high-speed serial bus that places DSL device 156 in communication with core logic 110.

AC-Link or Audio Codec Link 122 is an Intel® AC '97 compliant bus that conforms to a specification entitled "AC '97 Component Specification," Revision 2.1, published by Intel® Corporation on May 22, 1998 (or simply "AC '97 specification"). AC-Link 122 may support audio/modem device 152 in any configuration. Communications riser 150 utilizes AC-Link 122 as one of the connections between communications riser 150 and core logic 110 in order to establish a communication path between audio/modem device 152 and core logic 110.

Universal Serial Bus ("USB") is a hardware interface for low-speed peripherals such as the keyboard, mouse, joystick, scanner, printer and communications devices. USB has a maximum bandwidth of 12 Mbits/sec (equivalent to 1.5 Mbytes/sec), and up to 127 devices can be attached. Fast devices can use the full bandwidth, while lower-speed ones can transfer data using a 1.5 Mbits/sec sub-channel. USB allows peripheral components to be plugged in and plugged out without turning the host computer of communications system 100 off. Communications riser 150 may support various versions of the USB standard. USB 123 and serial bus 124 may be the existing buses in the host motherboard. For example, USB 123 may be a branch of an existing USB in the host motherboard. Communications riser 150 may support USB 123 via any audio/modem device 152, HomePNA PHY device 155, DSL device 156, and/or LAN PHY device 157. Communications riser 150 may utilize USB 123 as one of the connections between communications riser 150 and core logic 110 in order to establish a communication path between core logic 110 and any audio/modem device 152, HomePNA PHY device 155, DSL device 156, and/or LAN PHY device 157.

As shown in FIG. 1, communications riser 150 also supports serial bus 124 for communications between, for example, EEPROM 154 and core logic 110. One purpose of EEPROM 154 is to provide storage for configuration and enumeration data. Serial bus 124 is used to transfer data from EEPROM 154 to core logic 110. During the boot process of the host computer system, the host computer system BIOS reads the configuration data from EEPROM 154 via serial bus 124. The configuration data is used by the host computer system to program computer system devices. Furthermore, EEPROM 154 may include data as to which devices exist on communications riser 150 and as to which buses such devices are connected to.

Media independent interface ("MII") provides a port for transmitting and receiving data that is media independent and is capable of supporting various data rates and physical standards. For example, MII port can include data paths that are four bits wide in each direction as well as control and management signals. One primary function of MII buses 125 and 127 is to provide an interface to EPHY ("Ethernet PHYsical-layer interface"), including any necessary digital interface for EPHY management. MII management interface may utilize a communications protocol similar to a serial EEPROM. MII signals are defined in IEEE ("Institute of Electrical and Electronics Engineers") 802.3 standard for a CSMA/CD local area network access method, which is widely implemented in Ethernet. MII signals are used for LAN PHY interconnect, such as Ethernet, Cable Modem and other PHYs of 100 Mbps. For example, communications riser 150 may support seven-wire serial ("7WS") signals as defined in IEEE 802.3 standard. 7WS is a subset of MII and is used for Home LAN PHY interconnect, such as HomePNA, Wireless and other PHYs of 10 Mbps.

HomePNA enables simple, high-speed, and cost-effective home networks using the consumer's existing phone lines. HomePNA provides high-speed connections to information and broadband entertainment sources outside the home. Businesses accomplish such connections by deploying LANs; however, networks are not commonly deployed in the home due to the cost and complexity of installing the new wiring required by traditional LANs. HomePNA can deliver significant savings and greater utility by enabling shared access to a single Internet connection. Further, HomePNA can optimize for one higher-end shared peripheral rather than many low performance units. With a network standard for the home, future peripherals can be designed to connect directly to the network, simplifying installation.

Communications riser 150 may support at least two network buses, such as MII or 7WS buses 125 and 127 via HomePNA PHY or network device 155 and LAN PHY or network device 157. Communications riser 150 may utilize MII or 7WS buses 125 and 127 as connections between communications riser 150 and core logic 110 in order to establish a communication path between PHY devices 155 and 157 and core logic 110.

In the present example, communications riser 150 supports IPB 126 that places DSL device 156 in communication with core logic 110. Communications riser 150 utilizes IPB 126 as one of the connections between communications riser 150 and core logic 110 in order to establish a communication path between DSL device 156 and core logic 110. DSL device 156 may be controlled by IPB controller 116. IPB uses dual two-bit data buses, as input and output, which allow full-duplex data communications through core logic 110. IPB is a Time Division Multiplexing ("TDM") bus with status and control slots at the beginning and end of each frame. IPB allows for standardized link architecture, but yet offers the flexibility of using various protocols, such as G.Lite ADSL, SDSL or other flavors of DSL, further described below.

Again, by way of background, DSL refers to a class of technology used to obtain more bandwidth over existing telephone lines. DSL is a digital form of data communications that dramatically increases the digital capacity of ordinary telephone lines or the local loops into the homes or offices. Digital communication is the exchange of information in binary form. Unlike an analog signal, a digital signal does not use continuous waves to transmit information. Instead, DSL transmits data using discrete signals, for example, on and off states of electrical current. DSL provides an always-on operation in which digital data does not travel through the Public Switched Telephone Network ("PSTN"), but instead, at the Central Office ("CO") digital data is aggregated in a DSL Access Multiplexer ("DSLAM") and forwarded to the appropriate Internet service provider ("ISP") or data network.

Communications riser 150 may support various "flavors" of DSL. For example, communications riser 150 can support a High Bit Rate DSL ("HDSL"), which is a symmetric technology that provides the same transmission rate in both downstream and upstream directions. As another example, communications riser 150 may support Symmetric DSL ("SDSL"), Asymmetric DSL ("ADSL"), Rate Adaptive DSL ("RADSL"), Very High Bit Rate DSL ("VDSL") and/or ISDN DSL ("IDSL"). SDSL is an HDSL variation that uses only one cable pair and is offered in a wide range of speeds from 144 Kbps to 1.5 Mbps. SDSL is a rate adaptive technology. ADSL is a DSL flavor that shares the same line as the telephone, since it uses higher frequencies than the voice band. A version of ADSL is known as G.Lite ADSL. RADSL is version of DSL that adjusts speed based on line quality and VDSL is an asymmetric version of DSL that is used as the final drop from a fiber optic junction.

Thus, FIG. 1 illustrates an internal architecture of communications system 100, including communications riser 150 and core logic 110, in which communications riser 150 supports an Integrated Packet Bus, IPB 126, that places DSL device 156 in communication with core logic 110.

FIG. 2 illustrates a physical interface between a communications device 250 of a communications riser (not shown) and an IPB controller 210 in a core logic (not shown), in accordance with one embodiment. As shown, the Integrated Packet Bus, IPB 200, forms the physical interface between communications device 250 and IPB controller 210.

IPB 200 includes a reset signal ("RST") 222 that is an output signal from IPB controller 210 and an input signal to communications device 250. RST 222 is an asynchronous signal, which is active low and is used to reset communications device 250. IPB 200 further includes a receive data clock signal ("RDCLK") 224 and a transmit data clock signal ("TDCLK") 226 that may operate in a frequency range of 0 to 40 MHz. RDCLK 224 and/or TDCLK 226 may be generated by IPB controller 210 or the host controller of the host computer system (not shown). Typically, RDCLK 224 and TDCLK 226 are at about 3.3 volts.

IPB 200 also includes a receive frame signal ("RDFRAME") 228 and a transmit frame signal ("TDFRAME") 232. Both RDFRAME 228 and TDFRAME 232 are output signals originating from IPB controller 210 and are input signals to communications device 250. RDFRAME 228 is used as a frame synchronization pulse and is equivalent to sixteen (16) RDCLK 224 clocks, also referred to as "bit clocks". Similarly, TDFRAME 232 is used as a frame synchronization pulse and is equivalent to sixteen (16) TDCLK 226 clocks, also referred to as "bit clocks". In one embodiment, TDCLK 226 may be optional. If IPB 200 does not include TDCLK 226, TDFRAME 232 is set to a logic "0" and RDFRAME 228 is used to synchronize all frames.

RDFRAME 228 appears at the end of each IPB receive frame and is used to synchronize the IPB frame structure. A transition by RDFRAME 228 from low to high indicates the last slot of the frame, where each slot is sixteen (16) bit clocks long. RDFRAME 228 becomes active on the falling edge of the last bit clock of the previous frame. Similarly, TDFRAME 232 appears at the end of each IPB transmit frame and is used to synchronize the IPB frame structure. A transition by TDFRAME 232 from low to high indicates the last slot of the frame, where each slot is sixteen (16) bit clocks long. TDFRAME 232 becomes active on the falling edge of the last bit clock of the previous frame.

In one embodiment, IPB 200 includes dual two-bit data signals OUT(0:1) 234 and IN(0:1) 236. OUT(0:1) 234 and IN(0:1) 236 allow for full duplex data communications between IPB controller 210 and communications device 250. OUT(0:1) 234 carry data signals from IPB controller 210 to communications device 250, which data is output on the rising edge of TDCLK 226 and sampled on the falling edge of TDCLK 226. IN(0:1) 236 carry data signals from communications device 250 to IPB controller 210, which data is output on the rising edge of RDCLK 224 and sampled on the falling edge of RDCLK 224. TDCLK 226 clocks are used for clocking data signals carried by OUT(0:1) 234 and RDCLK 224 clocks are used for clocking data signals carried by IN(0:1) 236.

IPB frame structure is based on a Time Division Multiplexing ("TDM") design, with status and control slots at the beginning and end of each frame. TDM is a technology that transmits multiple signals simultaneously over a single transmission path. Each lower-speed signal is time sliced into one high-speed transmission. For example, three incoming 1,000 bps signals (A, B and C) can be interleaved into one 3,000 bps signal (AABBCCAABBCCAABBCC). The receiving end divides the single stream back into its original signals. IPB link is made up of 32-bit slots, i.e., 16 clock cycles in 2-bit wide bus OUT(0:1) 234, or 2-bit wide bus IN(0:1) 236, which are combined to create a frame. The frame length may be programmed such that each frame includes "n"+1 number of slots ranging from slot "0" to slot "n", where "n" is at least 1 and no greater than 15 in one embodiment described here. For each frame of length "n"+1, RDFRAME 228 or TDFRAME 232 goes active on the falling edge of bit 0 of slot "n−1"(i.e. the next to last slot in the frame), and since RDFRAME 228 and TDFRAME 232 are each 16 bit clocks long, RDFRAME 228 and TDFRAME 232 will go inactive on the falling edge of bit 0 of slot "n" (i.e. the last slot in the frame).

Figure 3A:
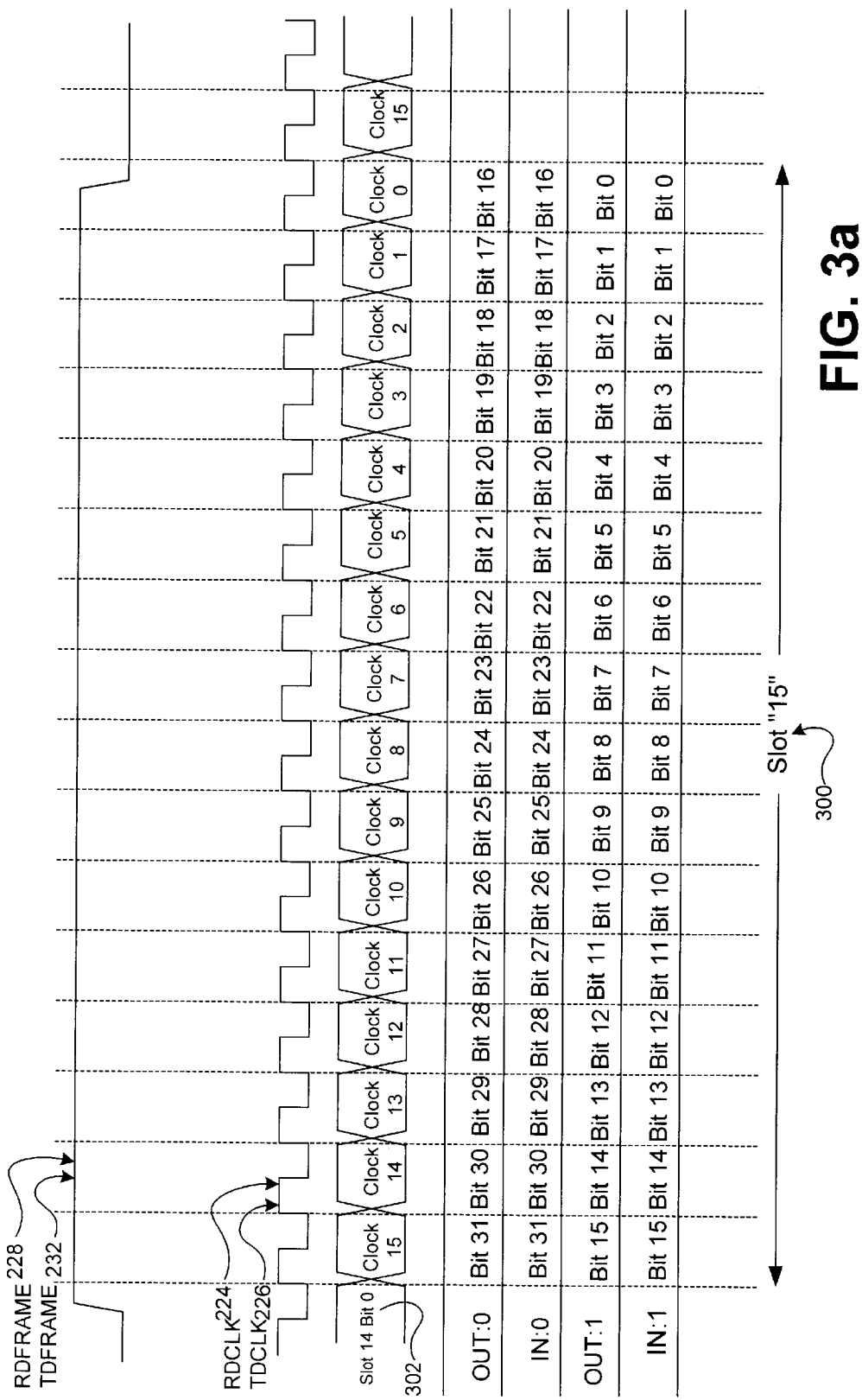
FIG. 3a illustrates an exemplary structure of a last slot of an IPB frame.

Each IPB frame includes a control slot followed by the remaining data slots. For example, where the frame length is 16 and n=15, slot "0" is a control slot and slots "1–15" are data slots. Further, as shown in FIG. 3a, each slot is arranged with the most significant bits transmitted first, and data is transmitted/received in two-bit wide streams, i.e., OUT(0:1) 234 and IN(0:1) 236. As stated above, the duration of RDFRAME 228 and TDFRAME 232 is 16 bit clocks long, which translates into transferring 16 bits of data on each one of the two-bit wide stream or 32 bits of data by each frame.

Turning to FIG. 3a, an exemplary structure of a last slot, i.e., data slot "15" 300, of an IPB frame is illustrated. In one embodiment, the frame length may be programmed such that the frame length is at least 2 slots and no more than 16 slots. For example, FIG. 3a illustrates slot "15" 300 of an IPB frame, i.e. n=15, and the frame length of the frame is 16 slots. In other words, the frame includes 16 slots, slot "0" through slot "15", and the last slot, slot "n", which in the present example is slot "15" 300, is illustrated in FIG. 3a. As shown, RDFRAME 228 and TDFRAME 232 transition to active state on the falling edge of bit "0" of slot "14"302 (i.e. the next to last slot in the frame), and RDFRAME 228 and TDFRAME 232 transition to their inactive state on the falling edge of bit "0" of slot "15" 300 (i.e. the last slot in the frame).

Figure 3B:
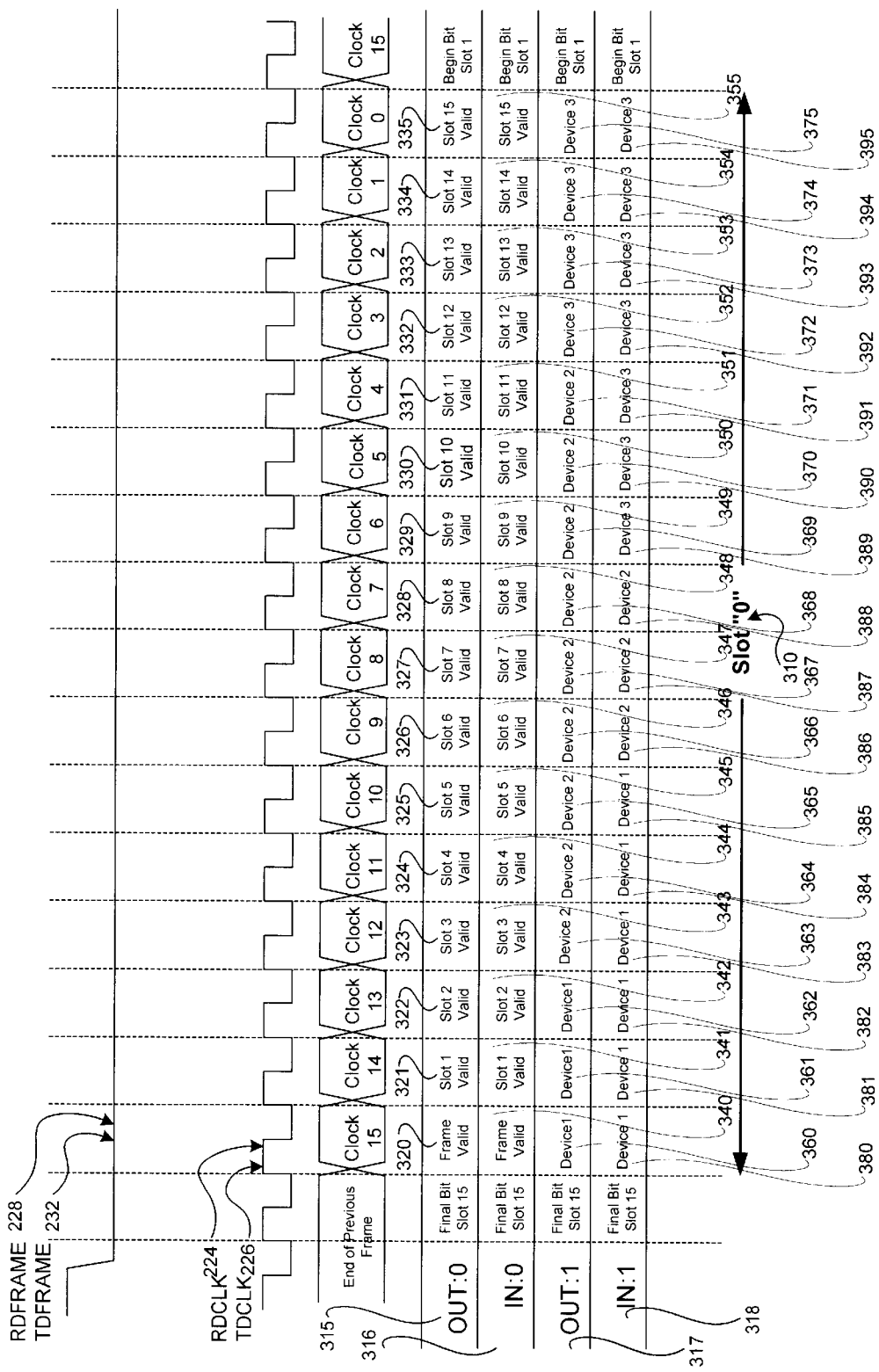
FIG. 3b illustrates an exemplary structure of a control slot of an IPB frame.

FIG. 3b is an exemplary structure of a control slot, i.e., slot "0" 310, of an IPB frame, in accordance with one embodiment. Bit "15" 320 is the OUT frame valid bit for data on pins OUT:0 315 and OUT:1 317. For example, bit "15" 320 containing logic "1" indicates that the OUT frame, on pins OUT:0 315 and OUT:1 317, includes valid data. On the other hand, bit "15" 320 containing logic "0", for example, indicates that the OUT frame, on pins OUT:0 315 and OUT:1 317, does not include valid data bits, and all of the frame bits should be ignored. Bits "14" through "0" 321–335, however, function as individual slot valid bits. In other words, bit "14" 321 containing logic "1" indicates that data bit "14" of OUT frame, on pins OUT:0 315 and OUT:1 317, includes valid data bits and bit "14" 321 containing logic "0" indicates that data bit "14" of OUT frame, on pins OUT:0 315 and OUT:1 317, does not include valid data bits and all of its $14^{th}$ data bits in data slots "1" through "15" should be ignored. Similarly, bit "13" 322 containing logic "1" indicates that data bit "13" of OUT frame, on pins OUT:0 315 and OUT:1 317, includes valid data bits and bit "13" 322 containing logic "0" indicates that data bit "13" of OUT frame, on pins OUT:0 315 and OUT:1 317, does not include valid data bits and all of its $13^{th}$ data bits in data slots "1" through "15" should be ignored, and so forth.

Similarly, bit "15" 340 is the IN frame valid bit for data on pins IN:0 316 and IN:1 318. For example, bit "15" 340 containing logic "1" indicates that the IN frame, on pins IN:0 316 and IN:1 318, includes valid data. On the other hand, bit "15" 340 containing logic "0", for example, indicates that the IN frame, on pins IN:0 316 and IN:1 318, does not include valid data bits, and all of the frame bits should be ignored. Bits "14" through "0" 341–355, however, function as individual slot valid bits. In other words, bit "14" 341 containing logic "1" indicates that data bit "14" of IN frame, on pins IN:0 316 and IN:1 318, includes valid data bits and bit "14" 341 containing logic "0" indicates that data bit "14" of IN frame, on pins IN:0 316 and IN:1 318, does not include valid data bits and all of its $14^{th}$ data bits in data slots "1" through "15" should be ignored. Similarly, bit "13" 342 containing logic "1" indicates that data bit "13" of IN frame, on pins IN:0 316 and IN:1 318, includes valid data bits and bit "13" 342 containing logic "0" indicates that data bit "13" of IN frame, on pins IN:0 316 and IN:1 318, does not include valid data bits and all of its $13^{th}$ data bits in data slots "1" through "15" should be ignored, and so forth.

In one embodiment of the present invention, bits "15" through "0" 360–375 may function as device indicator bits for the OUT frame on pins OUT:0 315 and OUT:1 317, so as to enable the integrated packet bus to support two or more communications devices. In one embodiment, transitions from "1" to "0" and from "0" to "1" in bits "15" through "0" 360–375 indicate that data bits in the OUT frame, on pins OUT:0 315 and OUT:1 317, from the start of a transition until the start of a next transition belong to a particular device. For example, as shown in FIG. 3b, bits "15" through "13" 360–362 indicate that data bits "15" through "13" in the OUT frame, on pins OUT:0 315 and OUT:1 317, belong to Device 1; bits "12" through "4" 363–371 indicate that data bits "12" through "4" in the OUT frame, on pins OUT:0 315 and OUT:1 317, belong to Device 2; and bits "3" through "0" indicate that data bits "3" through "0" 372–375 in the OUT frame, on pins OUT:0 315 and OUT:1 317, belong to Device 3.

As an example, a data bit pattern such as "0001111111110000" in the OUT frame bits 360–375, on pins OUT:0 315 and OUT:1 317, indicate that the first three bits of data in each data slot "1" through "15" belong to Device 1. Next, the transition from "0" to "1" on control bit 363 indicates that the next nine bits of data in each data slot "1" through "15" belong to Device 2. Finally, the transition from "1" to "0" on control bit 372 indicates that the next four bits of data in each data slot "1" through "15" belong to Device 3. It should be noted that control bits "15" through "0" 360–375 may be used to control or select sixteen different communication devices. Accordingly, the integrated packet bus may support up to sixteen communications devices.

Furthermore, bits "15" through "0" 380–395 may function as device indicator bits for the IN frame, on pins IN:0 316 and IN:1 318. In one embodiment, transitions from "1" to "0" and from "0" to "1" in bits "15" through "0" 380–395 indicate that data bits in the IN frame, on pins IN:0 316 and IN:1 318, from the start of a transition until the start of a next transition are from a particular device. For example, as shown in FIG. 3b, bits "15" through "10" 380–385 indicate that data bits "15" through "10" in the IN frame, on pins IN:0 316 and IN:1 318, are from Device 1; bits "9" through "7" indicate that data bits "9" through "7" 386–388 in the IN frame, on pins IN:0 316 and IN:1 318, are from Device 2; and bits "6" through "0" 389–395 indicate that data bits "6" through "0" in the IN frame, on pins IN:0 316 and IN:1 318, are from Device 3.

As an example, a data bit pattern such as "0000001110000000" in the IN frame bits 380–395, on pins IN:0 316 and IN:1 318, indicate that the first six bits of data in each data slot "1" through "15" belong to Device 1. Next, the transition from "0" to "1" on control bit 386 indicate that the next three bits of data in each data slot "1" through "15" belong to Device 2. Finally, the transition from "1" to "0" on control bit 389 indicate that the next seven bits of data in each data slot "1" through "15" belong to Device 3.

As shown, in this embodiment, the integrated packet bus is capable of supporting communication devices having asymmetrical receiver and transmitter throughput. For example, as shown, three data bits 361–363 are allocated to the receiver of Device 1, whereas six data bits 381–386 are allocated to the transmitter of Device 1. However, by allocating the same number of bits, a symmetrical throughput may also be supported for each device. Moreover, it should be noted that control bits "15" through "0" of OUT and IN lines, 360–375 and 380–395, respectively, may be used to select sixteen different communication devices. Accordingly, the integrated packet bus may support up to sixteen communications devices.

Moreover, in one embodiment, the IPB may support more than two output and two input pins. For example, the embodiment depicted in FIG. 3b may be expanded to include OUT:2–7 and IN:2–7. In other words, the IPB may be extended to support eight output and eight input pins. In such event, in the above example, Device 1 could receive the first three bits of data from each data slot "1" through "15" of the OUT frame, on pins OUT:0–7 (not shown), and could transmit the first six bits of data in each data slot "1" through "15" of the IN frame, on pins IN:0–7 (not shown).

Figure 4:
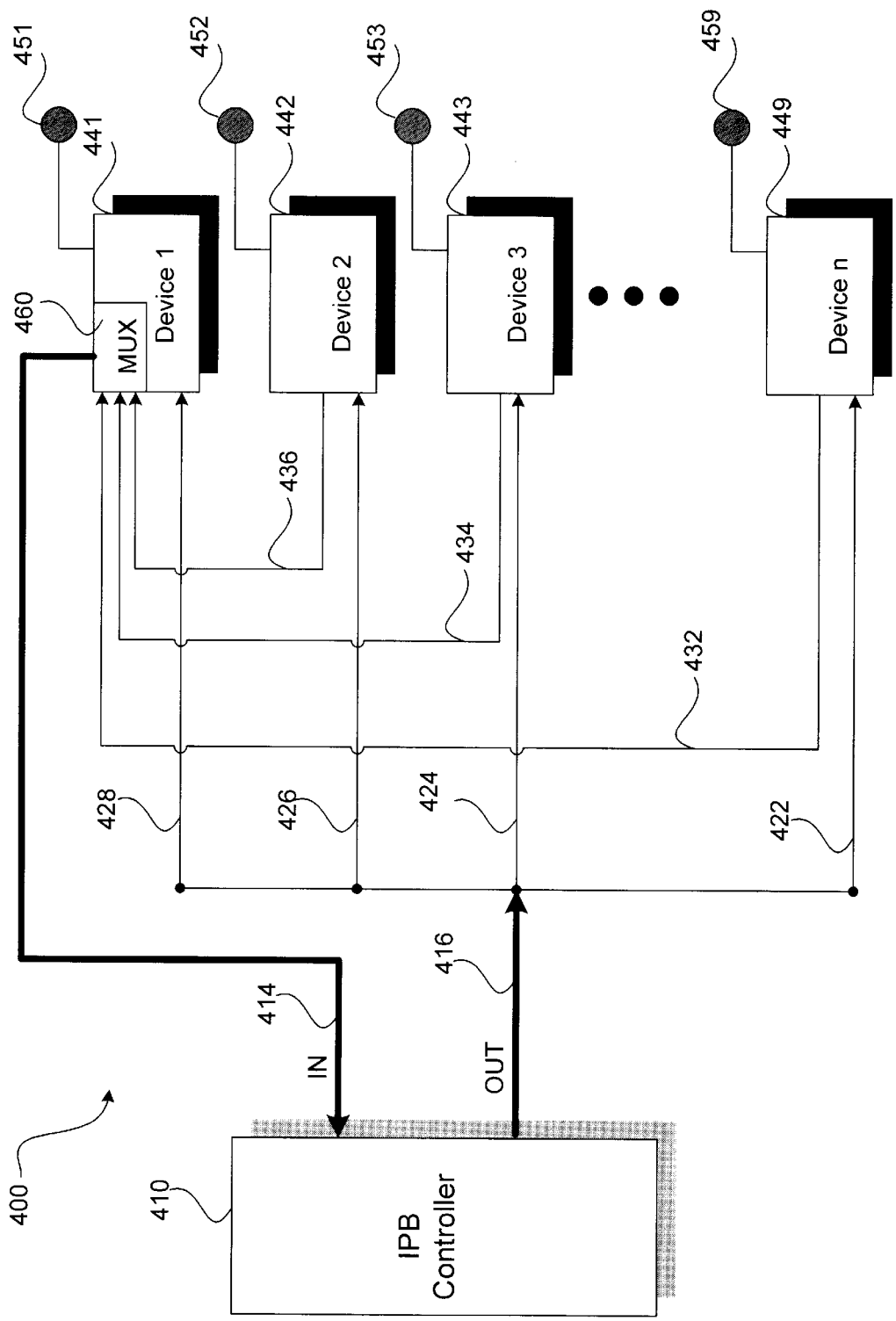
FIG. 4 illustrates an IPB signal block diagram of a physical interface between multiple communications devices and an IPB controller.

FIG. 4 illustrates an IPB signal block diagram 400 of a physical interface between multiple communications devices 441–449 and an IPB controller 410. As shown, in one embodiment, each communications device 441–449 includes a device strap 451–459, respectively. Each device strap 451–459 configures its respective device 441–459 to receive and transmit its data bits at the appropriate time and in the proper data bits of each data slot "1" through "15". In the example given above, strap option 451 configures communications device 441 such that communications device 441 reads three data bits from OUT 416 on OUT frame bits "15" through "13", as transmitted by IPB controller 410 and received by communications device 441 on input line 428; strap option 452 configures communications device 442 such that communications device 442 reads nine data bits from OUT 416 on OUT frame bits "12" through "4", as transmitted by IPB controller 410 and received by communications device 442 on input line 426; and strap option 453 configures communications device 443 such that communications device 443 reads four data bits from OUT 416 on OUT frame bits "3" through "0", as transmitted by IPB controller 410 and received by communications device 443 on input line 424.

Similarly, in the above example, strap option 451 configures communications device 441 such that communications device 441 provides six data bits for IN 414, for receipt by IPB controller 410, on IN frame bits "15" through "10"; strap option 452 configures communications device 442 such that communications device 442 provides three data bits for IN 414, for receipt by IPB controller 410, on IN frame bits "9" through "7"; and strap option 453 configures communications device 443 such that communications device 443 provides seven data bits for IN 414, for receipt by IPB controller 410, on IN frame bits "6" through "0".

In one embodiment, communications device 441 may include a multiplexer 460 for receiving data bits from each communications device 441–449, on output lines 432, 434, 436 and communications device 441 output line (not shown). Multiplexer 460 is used to multiplex and place such data bits on IN 414 for transmission to IPB controller 410. It should be noted that multiplexer 460 may be placed in any of communications devices 441–449. In one embodiment, multiplexer 460 may be outside of communications devices 441–449. For example, in one embodiment, multiplexer 460 may be placed inside IPB controller 410, in which event, output lines 432, 434, 436 and communications device 441 output line (not shown) are directed to IPB controller 410 for multiplexing by multiplexer 460.

Figure 5:
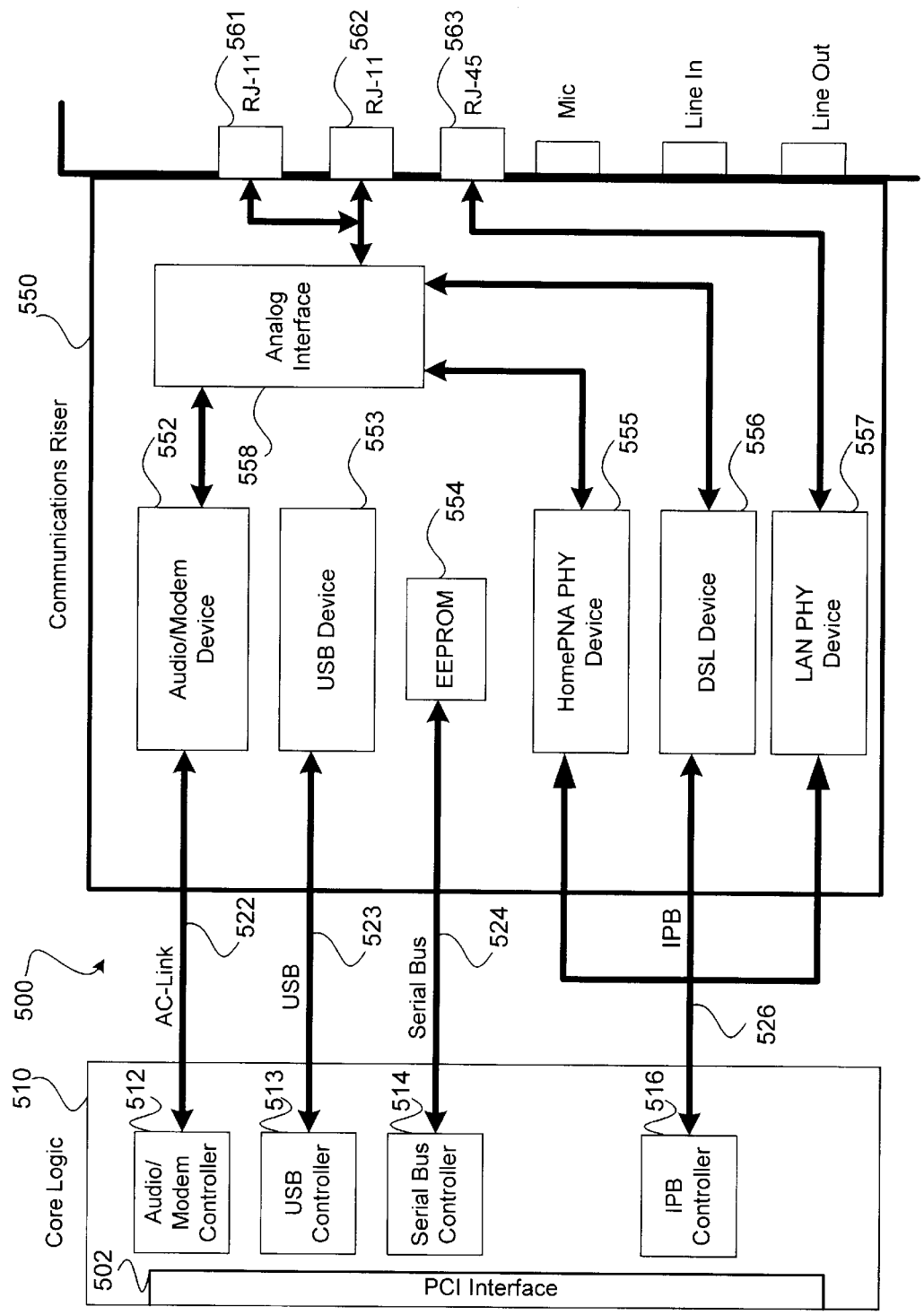
FIG. 5 illustrates a block diagram of an internal architecture of a communications system, including a communications riser and a core logic.

FIG. 5 illustrates a block diagram of an internal architecture of communications system 500, including communications riser 550 and core logic 510, in accordance with one embodiment. As shown in FIG. 5, communications riser 550 supports audio/modem functions using audio/modem device 552 in communications with analog interface 558, which can be, for example, as described above in connection with FIG. 1. As shown, analog interface 558 is in communication with two RJ-11 connectors, telco RJ-11 connector 561, used by communications system 500 for communications with a Central Office ("CO") or outside telephone line, and handset RJ-11 connector 562, used by communications system 500 for connection to a handset for voice communications on the outside telephone line, as described above in connection with FIG. 1.

Communications riser 550 further supports DSL functions using DSL device 556 and supports HomePNA functions using HomePNA PHY device or network device 555. As shown, DSL device 556 and HomePNA PHY device 555 are also in communication with analog interface 558, which is in turn in communication with telco RJ-11 connector 561 and handset RJ-11 connector 562, as described above in connection with FIG. 1. Communications riser 550 also includes LAN PHY device or network device 557. LAN PHY device 557 is in communication with Ethernet RJ-45 connector 563 for network communications purposes, as described above in connection with FIG. 1. Communications riser 550 may also support USB device 553 and may also include EEPROM 554 for configuration purposes, as described above in connection with FIG. 1.

In the embodiment shown in FIG. 5, audio/modem device 552, USB device 553, and EEPROM 554, on communications riser 550, may be controlled by PCI controllers, such as audio/modem controller 512, USB controller 513, and serial bus controller 514, respectively, which are located in core logic 510. In one embodiment, one or more controller functions may be provided by the host computer system. Devices on communications riser 550 may be accessed through PCI interface 502, so that devices on communications riser 550 appear as PCI devices to the host computer, as described above in connection with FIG. 1. In another embodiment, audio/modem device 552, HomePNA device 555, DSL device 556 and/or LAN device 557 may be mounted on the host computer motherboard and accessed via PCI interface 502.

Communications system 500 may utilize conventional buses, such as AC-Link 522, USB 523, serial bus 524, and/or MII or 7WS (not shown) for communications with computer system core logic 510, or in other examples, PCI ASIC or both via PCI interface 502. In the embodiment shown in FIG. 5, communications riser 550 supports IPB 526 for communications with computer system core logic 510. As shown in FIG. 5, according to one embodiment, the IPB 526 is capable of supporting multiple devices, such as HomePNA device 555, DSL device 556, and LAN device 557. Thus, a single IPB 526 places HomePNA device 555, DSL device 556, and LAN device 557 in communication with core logic 510.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A communications system comprising:
    at least two communications devices;
    a communications bus; and
    a controller for communicating data with each of said communications devices via said communications bus;
    wherein said communications bus supports a communications protocol including a control slot and at least one data slot, each said slot having at least two bits, and wherein each of said at least two bits of said control slot selects which of said at least two bits of said at least one data slot belong to which of said at least two communications devices.

2. The communications system of claim 1, wherein said communications bus is an integrated packet bus and includes two output data signals and two input data signals, and wherein each of said at least two bits of said control slot selects which of said at least two bits of said at least one data slot, on each of said data signals, belong to which of said at least two communications devices.

3. The communications system of claim 2, wherein said communications protocol includes two control slots, and wherein one of said control slots corresponds to said input data signals and the other of said control slots corresponds to said output data signals.

4. The communications system of claim 1, wherein said communications bus is an integrated packet bus and includes eight output data signals and eight input data signals, and wherein each of said at least two bits of said control slot selects which of said at least two bits of said at least one data slot, on each said data signal, belong to which of said at least two communications devices.

5. The communications system of claim 1, wherein said at least two communications devices include a DSL device, a HomePNA device and a LAN device and said communications bus is an integrated packet bus.

6. An communications bus for data communications between a controller and at least two communications devices, said communications bus comprising:
    a receive data clock signal;
    a transmit data clock signal;
    a receive frame signal;
    a transmit frame signal;
    at least one output data signal; and
    at least one input data signal;
    wherein said at least one output data signal carries a control slot having at least two bits and a data slot having at least two bits from said controller to said at least two said communications devices, and wherein each of said at least two bits of said control slot selects which of said at least two bits of said at least one data slot belong to which of said at least two communications devices.

7. The communications bus of claim 6, wherein said communications bus is an integrated packet bus and said at least one said output data signal includes two output data signals and said at least one said input data signal includes two input data signals, and wherein each of said at least two bits of said control slot selects which of said at least two bits of said at least one data slot, on each said data signal, belong to which of said at least two communications devices.

8. The communications bus of claim 6, wherein said at least one input data signal carries a control slot having at least two bits and a data slot having at least two bits from said at least two said communications devices to said controller, and wherein each of said at least two bits of said control slot selects which of said at least two bits of said at least one data slot belong to which of said at least two communications devices.

9. The communications bus of claim 6, wherein said at least said one output data signal includes eight output data signals and said at least said one input data signal includes eight input data signals, and wherein each of said at least two bits of said control slot selects which of said at least two bits of said at least one data slot, on each said data signal, belong to which of said at least two communications devices.

10. The communications bus of claim 6, wherein said at least two communications devices include a DSL device, a HomePNA device and a LAN device and said communications bus is an integrated packet bus.

11. A communications method for data communications on a communications bus linking a controller and at least two communications devices, said communications method comprising the steps of:
    transmitting a first control slot having at least two bits; and
    transmitting at least one first data slot having at least two bits;

wherein said at least two bits of said first control slot indicate which of said at least two bits of said at least one first data slot belong to which of said at least two communications devices.

12. The communications method of claim 11, wherein said communications bus is an integrated packet bus and includes two output data signals, and wherein each of said at least two bits of said first control slot selects which of said at least two bits of said at least one first data slot, on each of said output data signals, belong to which of said at least two communications devices.

13. The communications method of claim 11 further comprising the steps of:
receiving a second control slot having at least two bits; and
receiving at least one second data slot having at least two bits;
wherein said at least two bits of said second control slot indicate which of said at least two bits of said at least one second data slot belong to which of said at least two communications devices.

14. The communications method of claim 11, wherein said communications bus is an integrated packet bus and includes eight output data signals and eight input data signals, and wherein each of said at least two bits of said first control slot selects which of said at least two bits of said at least one data slot, on each of said output data signals, belong to which of said at least two communications devices.

15. The communications method of claim 11, wherein said at least two communications devices include a DSL device, a HomePNA device and a LAN device and said communications bus is an integrated packet bus.

16. A communications method for data communications on a communications bus linking a controller and at least two communications devices, said communications method comprising the steps of:
receiving a first control slot having at least two bits; and
receiving at least one first data slot having at least two bits;
wherein said at least two bits of said first control slot indicate which of said at least two bits of said at least one first data slot belong to which of said at least two communications devices.

17. The communications method of claim 16, wherein said communications bus is an integrated packet bus and includes two input data signals, and wherein each of said at least two bits of said first control slot selects which of said at least two bits of said at least one first data slot, on each of said input data signals, belong to which of said at least two communications devices.

18. The communications method of claim 16 further comprising the steps of:
transmitting a second control slot having at least two bits; and
transmitting at least one second data slot having at least two bits;
wherein said at least two bits of said second control slot indicate which of said at least two bits of said at least one second data slot belong to which of said at least two communications devices.

19. The communications method of claim 16, wherein said communications bus is an integrated packet bus and includes eight input data signals, and wherein each of said at least two bits of said first control slot selects which of said at least two bits of said at least one first data slot, on each of said input data signals, belong to which of said at least two communications devices.

20. The communications method of claim 16, wherein said at least two communications devices include a DSL device, a HomePNA device and a LAN device and said communications bus is an integrated packet bus.

* * * * *